(12) United States Patent
Nishida et al.

(10) Patent No.: US 10,539,892 B2
(45) Date of Patent: Jan. 21, 2020

(54) ELECTROPHOTOGRAPHIC PHOTOSENSITIVE MEMBER, PROCESS CARTRIDGE, AND ELECTROPHOTOGRAPHIC IMAGE-FORMING APPARATUS

(71) Applicant: CANON KABUSHIKI KAISHA, Tokyo (JP)

(72) Inventors: Tsutomu Nishida, Mishima (JP); Yuka Ishiduka, Suntou-gun (JP); Kenichi Kaku, Suntou-gun (JP); Nobuhiro Nakamura, Numazu (JP); Hiroyuki Watanabe, Suntou-gun (JP); Hideharu Shimozawa, Numazu (JP); Atsushi Okuda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/423,393

(22) Filed: May 28, 2019

(65) Prior Publication Data
US 2019/0369515 A1     Dec. 5, 2019

(30) Foreign Application Priority Data
May 31, 2018   (JP) .................. 2018-105590

(51) Int. Cl.
*G03G 5/147*    (2006.01)
*G03G 21/18*   (2006.01)
(Continued)

(52) U.S. Cl.
CPC .......... *G03G 5/14786* (2013.01); *G03G 9/16* (2013.01); *G03G 21/18* (2013.01); *C08L 33/14* (2013.01); *G03G 2221/183* (2013.01)

(58) Field of Classification Search
CPC .. G03G 5/147; G03G 5/14734; G03G 5/0614; G03G 5/071
See application file for complete search history.

(56) References Cited

U.S. PATENT DOCUMENTS

| 6,991,881 B2 | 1/2006 | Ogaki et al. |
| 6,994,941 B2 | 2/2006 | Tanaka et al. |

(Continued)

FOREIGN PATENT DOCUMENTS

| JP | 2005-208112 | 8/2005 |
| JP | 2015-225132 | 12/2015 |
| JP | 2017-142336 A | 8/2017 |

OTHER PUBLICATIONS

U.S. Appl. No. 16/272,268, Hideharu Shimozawa, filed Feb. 11, 2019.

(Continued)

*Primary Examiner* — Peter L Vajda
(74) *Attorney, Agent, or Firm* — Venable LLP

(57) ABSTRACT

Provided is an electrophotographic photosensitive member that is reduced in exposure memory and is excellent in electrical characteristics and durability. The electrophotographic photosensitive member includes in this order: a support; a photosensitive layer; and a protective layer, wherein the protective layer contains a resin having a (Continued)

structure represented by the following general formula (1) and a structure represented by the following general formula (2).

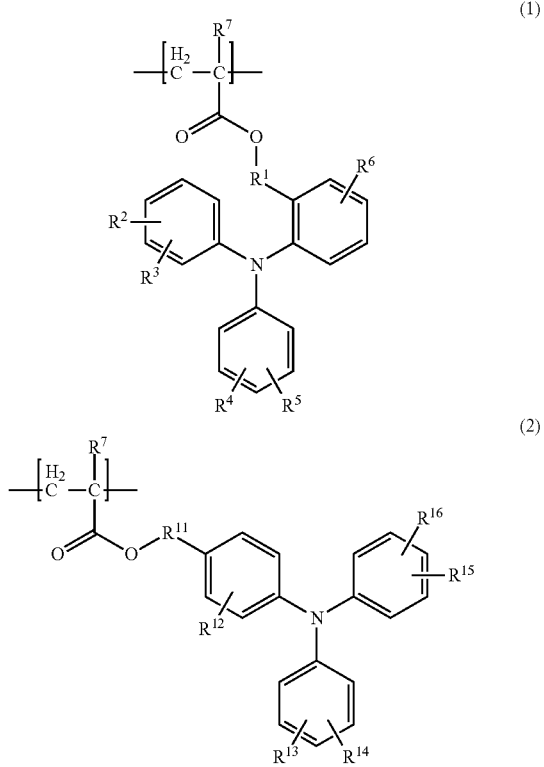

10 Claims, 1 Drawing Sheet

(51) Int. Cl.
G03G 9/16 (2006.01)
C08L 33/14 (2006.01)

(56) References Cited

U.S. PATENT DOCUMENTS

| | | | |
|---|---|---|---|
| 7,001,699 B2 | 2/2006 | Tanaka et al. | |
| 7,045,261 B2 | 5/2006 | Tanaka et al. | |
| 7,585,604 B2 | 9/2009 | Ogaki et al. | |
| 7,645,547 B2 | 1/2010 | Okuda et al. | |
| 7,655,370 B2 | 2/2010 | Kitamura et al. | |
| 7,910,274 B2 | 3/2011 | Tanaka et al. | |
| 7,927,774 B2 | 4/2011 | Ogaki et al. | |
| 8,088,541 B2 | 1/2012 | Tanaka et al. | |
| 8,455,170 B2 | 6/2013 | Nakamura et al. | |
| 8,481,236 B2 | 7/2013 | Tanaka et al. | |
| 8,632,935 B2 | 1/2014 | Sugiyama et al. | |
| 8,669,027 B2 | 3/2014 | Anezaki et al. | |
| 8,753,789 B2 | 6/2014 | Ogaki et al. | |
| 8,765,335 B2 | 7/2014 | Tanaka et al. | |
| 8,783,209 B2 | 7/2014 | Kaku et al. | |
| 8,815,479 B2 | 8/2014 | Shida et al. | |
| 8,846,281 B2 | 9/2014 | Okuda et al. | |
| 8,865,381 B2 | 10/2014 | Tanaka et al. | |
| 8,921,020 B2 | 12/2014 | Murai et al. | |
| 8,980,508 B2 | 3/2015 | Okuda et al. | |
| 8,980,509 B2 | 3/2015 | Noguchi et al. | |
| 9,027,550 B2 | 5/2015 | Okuda et al. | |
| 9,029,054 B2 | 5/2015 | Okuda et al. | |
| 9,040,214 B2 | 5/2015 | Fujii et al. | |
| 9,046,797 B2 | 6/2015 | Fujii et al. | |
| 9,063,505 B2 | 6/2015 | Sekiya et al. | |
| 9,069,267 B2 | 6/2015 | Kaku et al. | |
| 9,114,565 B2 | 8/2015 | Kawai et al. | |
| 9,170,506 B2 | 10/2015 | Tanaka et al. | |
| 9,170,507 B2 | 10/2015 | Sugiyama et al. | |
| 9,188,888 B2 | 11/2015 | Okuda et al. | |
| 9,280,071 B2 | 3/2016 | Maruyama et al. | |
| 9,280,072 B2 | 3/2016 | Ogaki et al. | |
| 9,282,615 B2 | 3/2016 | Yamagishi et al. | |
| 9,304,416 B2 | 4/2016 | Noguchi et al. | |
| 9,341,964 B2 | 5/2016 | Ogaki et al. | |
| 9,372,417 B2 | 6/2016 | Fujii et al. | |
| 9,372,418 B2 | 6/2016 | Shida et al. | |
| 9,372,419 B2 | 6/2016 | Tsuji et al. | |
| 9,436,106 B2 | 9/2016 | Kuno et al. | |
| 9,436,107 B2 | 9/2016 | Murakami et al. | |
| 9,459,545 B2 | 10/2016 | Tanaka et al. | |
| 9,523,929 B2 | 12/2016 | Nakamura et al. | |
| 9,535,346 B2 | 1/2017 | Sekiya et al. | |
| 9,541,850 B2 | 1/2017 | Nishida et al. | |
| 9,563,139 B2 | 2/2017 | Kawahara et al. | |
| 9,575,422 B2 | 2/2017 | Okuda et al. | |
| 9,599,915 B2 | 3/2017 | Anezaki et al. | |
| 9,599,917 B2 | 3/2017 | Okuda et al. | |
| 9,645,515 B2 | 5/2017 | Kuno et al. | |
| 9,645,516 B2 | 5/2017 | Kawahara et al. | |
| 9,684,277 B2 | 6/2017 | Yamamoto et al. | |
| 9,726,992 B2 | 8/2017 | Sakuma et al. | |
| 9,772,596 B2 | 9/2017 | Mitsui et al. | |
| 9,791,792 B2 | 10/2017 | Miyauchi et al. | |
| 9,869,032 B2 | 1/2018 | Kawahara et al. | |
| 10,073,362 B2 | 9/2018 | Fujii et al. | |
| 10,162,278 B2 | 12/2018 | Kuno et al. | |
| 10,203,617 B2 | 2/2019 | Kuno et al. | |
| 10,303,085 B2 | 5/2019 | Sato et al. | |
| 2005/0208402 A1 | 9/2005 | Tanaka et al. | |
| 2010/0119260 A1 | 5/2010 | Egawa et al. | |
| 2012/0202146 A1* | 8/2012 | Yamada | G03G 5/0589 430/56 |
| 2014/0004450 A1 | 1/2014 | Tokimitsu et al. | |
| 2014/0093281 A1 | 4/2014 | Takahashi et al. | |
| 2015/0185630 A1 | 6/2015 | Ito et al. | |
| 2015/0185634 A1 | 7/2015 | Sekiya et al. | |
| 2015/0316863 A1 | 11/2015 | Tanaka et al. | |
| 2015/0346617 A1 | 12/2015 | Kawahara et al. | |
| 2015/0362847 A1 | 12/2015 | Tanaka et al. | |
| 2016/0091807 A1 | 3/2016 | Tanaka et al. | |
| 2016/0131985 A1 | 5/2016 | Tanaka et al. | |
| 2017/0060008 A1 | 3/2017 | Okuda | |
| 2018/0059558 A1 | 3/2018 | Ito et al. | |
| 2018/0341190 A1 | 11/2018 | Nishi et al. | |

OTHER PUBLICATIONS

U.S. Appl. No. 16/286,762, Nobuhiro Nakamura, filed Feb. 27, 2019.
U.S. Appl. No. 16/287,102, Tsutomu Nishida, filed Feb. 27, 2019.
U.S. Appl. No. 16/423,292, Yasutaka Yagi, filed May 28, 2019.
U.S. Appl. No. 16/423,326, Hiroyuki Watanabe, filed May 28, 2019.
U.S. Appl. No. 16/423,337, Yuka Ishiduka, filed May 28, 2019.
U.S. Appl. No. 16/423,381, Atsushi Okuda, filed May 28, 2019.
U.S. Appl. No. 16/423,418, Hiroyuki Watanabe, filed May 28, 2019.
U.S. Appl. No. 16/423,429, Nobuhiro Nakamura, filed May 28, 2019.

* cited by examiner

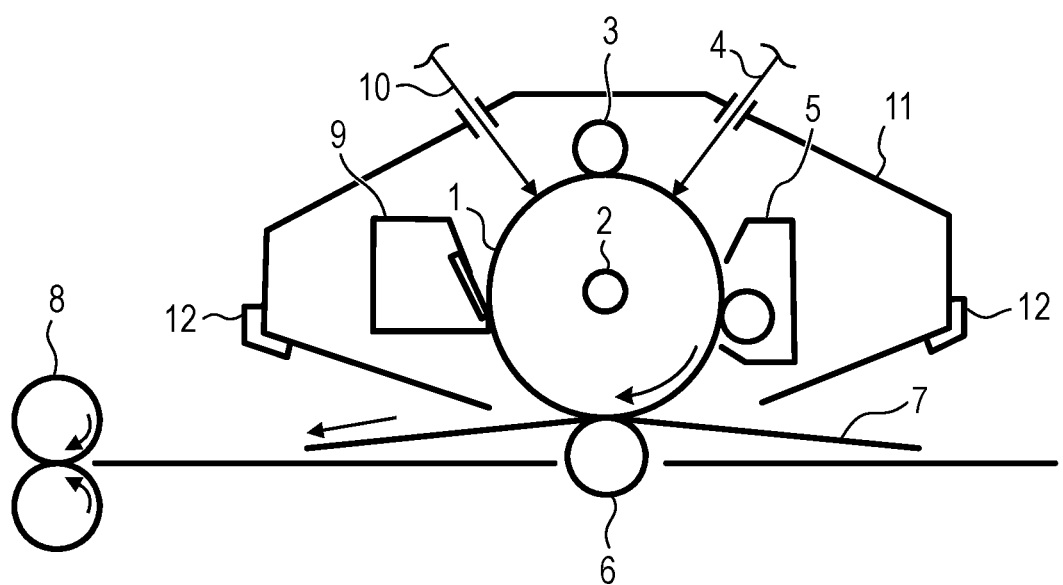

ELECTROPHOTOGRAPHIC PHOTOSENSITIVE MEMBER, PROCESS CARTRIDGE, AND ELECTROPHOTOGRAPHIC IMAGE-FORMING APPARATUS

BACKGROUND OF THE INVENTION

Field of the Invention

The present disclosure relates to an electrophotographic photosensitive member, and a process cartridge and an electrophotographic image-forming apparatus each including the electrophotographic photosensitive member.

Description of the Related Art

A wide variety of investigations have heretofore been made on an electrophotographic photosensitive member to be mounted on an electrophotographic image-forming apparatus (hereinafter sometimes referred to as "electrophotographic apparatus") for improving its image quality and durability. An example thereof is an investigation in which a radically polymerizable resin is used in the surface of the electrophotographic photosensitive member to improve its abrasion resistance. Meanwhile, in some cases, image smearing occurs as a harmful effect due to the improvement in abrasion resistance by the use of the radically polymerizable resin in the surface of the electrophotographic photosensitive member. The image smearing is a phenomenon in which an output image blurs owing to the blurring of an electrostatic latent image to be formed on the surface of the photosensitive member. In order to solve the image smearing, an investigation has been made on the use of a compound having a polymerizable functional group as the radically polymerizable compound.

In each of Japanese Patent Application Laid-Open No. 2015-225132 and Japanese Patent Application Laid-Open No. 2005-208112, there is a disclosure of a technology involving using a triarylamine compound having an acryloyloxy group or a methacryloyloxy group.

SUMMARY OF THE INVENTION

According to one aspect of the present disclosure, there is provided an electrophotographic photosensitive member including in this order: a support; a photosensitive layer; and a protective layer, wherein the protective layer contains a resin having a structure represented by the following general formula (1) and a structure represented by the following general formula (2):

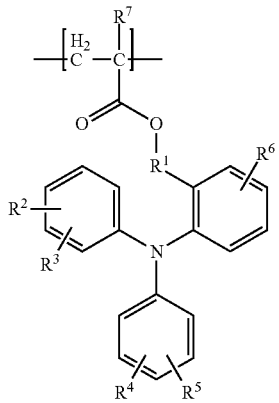

(1)

in the formula (1), $R^1$ represents an alkylene group or phenylene group that may have a substituent, and $R^2$ to $R^7$ each independently represent a hydrogen atom, a methyl group, or an ethyl group;

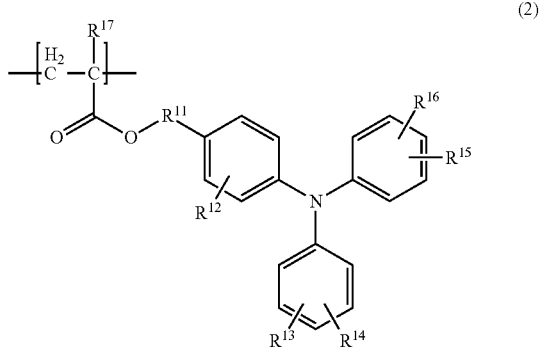

(2)

in the formula (2), $R^{11}$ represents an alkylene group or phenylene group that may have a substituent, and $R^{12}$ to $R^{17}$ each independently represent a hydrogen atom, a methyl group, or an ethyl group.

According to another aspect of the present disclosure, there is provided a process cartridge including: the electrophotographic photosensitive member; and at least one unit selected from the group consisting of a charging unit, a developing unit, and a cleaning unit, the process cartridge integrally supporting the electrophotographic photosensitive member and the at least one unit, and being removably mounted onto a main body of an electrophotographic apparatus.

According to still another aspect of the present disclosure, there is provided an electrophotographic apparatus including: the electrophotographic photosensitive member; and at least one unit selected from the group consisting of a charging unit, an exposing unit, a developing unit, and a transferring unit.

Further features of the present invention will become apparent from the following description of exemplary embodiments with reference to the attached drawing.

BRIEF DESCRIPTION OF THE DRAWINGS

FIGURE is a view for illustrating an example of the schematic construction of an electrophotographic image-forming apparatus including a process cartridge including an electrophotographic photosensitive member of the present disclosure.

DESCRIPTION OF THE EMBODIMENTS

According to an investigation by the present inventors, in an electrophotographic photosensitive member described in Japanese Patent Application Laid-Open No. 2015-225132 or Japanese Patent Application Laid-Open No. 2005-208112, triarylamine structures positioned in side chain portions of a polymer chain forming a resin aggregate because of their high stacking properties in some cases. When excessive aggregation occurs, the charge-transporting ability of any such triarylamine structure is not sufficiently exhibited, and hence an exposure memory worsens in some cases.

Therefore, an object of the present disclosure is to provide an electrophotographic photosensitive member that is suppressed in stacking of a triarylamine structure, is reduced in exposure memory, and is excellent in electrical characteristics and durability.

The present disclosure is described in detail below by way of a preferred embodiment.

An electrophotographic photosensitive member (hereinafter sometimes referred to as "photosensitive member") according to one aspect of the present disclosure includes in this order: a support; a photosensitive layer; and a protective layer, wherein the protective layer contains a resin having a structure represented by the general formula (1) and a structure represented by the general formula (2).

A triarylamine structure positioned in a side chain portion of a polymer chain forming a resin has a high stacking property derived from its molecular structure, and hence a plurality of triarylamine structures have heretofore aggregated in some cases. When excessive aggregation occurs, the charge-transporting ability of any such triarylamine structure is not sufficiently exhibited, and hence the exposure memory of an electrophotographic photosensitive member worsens. An improvement in dispersibility of the triarylamine structure has been considered to be effective in solving the worsening. In view of the foregoing, the inventor(s) of the present disclosure have made extensive investigations, and as a result, have revealed that, when the protective layer of the electrophotographic photosensitive member contains the resin having the structure represented by the general formula (1) and the structure represented by the general formula (2), the exposure memory of the electrophotographic photosensitive member can be reduced. This is probably because the presence of the structure represented by the general formula (1) and the structure represented by the general formula (2) can add appropriate strain to the molecular structure of a polymer chain forming the resin in the protective layer to suppress the excessive aggregation of the triarylamine structures.

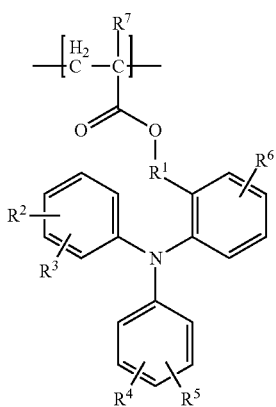

(1)

In the formula (1), $R^1$ represents an alkylene group or phenylene group that may have a substituent. The substituents of the alkylene group and the phenylene group may each be, for example, a methyl group. $R^2$ to $R^7$ each independently represent a hydrogen atom, a methyl group, or an ethyl group. In addition, $R^1$ preferably represents an alkylene group having 2 or more and 5 or less carbon atoms, and $R^7$ preferably represents a hydrogen atom.

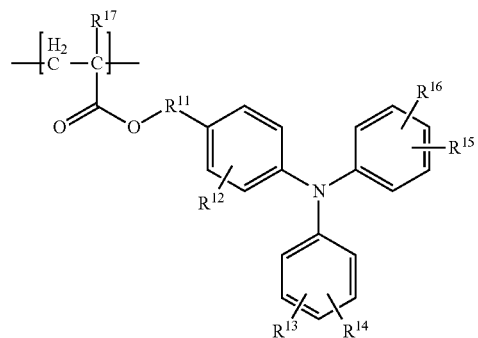

(2)

In the formula (2), $R^{11}$ represents an alkylene group or phenylene group that may have a substituent. The substituents of the alkylene group and the phenylene group may each be, for example, a methyl group. $R^{12}$ to $R^{17}$ each independently represent a hydrogen atom, a methyl group, or an ethyl group. In addition, $R^{11}$ preferably represents an alkylene group having 2 or more and 5 or less carbon atoms, and $R^{17}$ preferably represents a hydrogen atom.

Preferred examples of the structure represented by the general formula (1) are represented by the formula (1-1) to the formula (1-6). Of those, structures represented by the formula (1-2) and the formula (1-3) are more preferred.

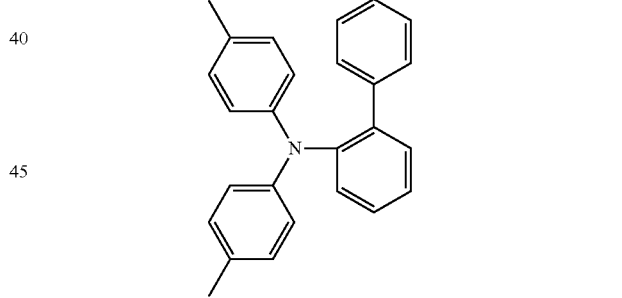

(1-1)

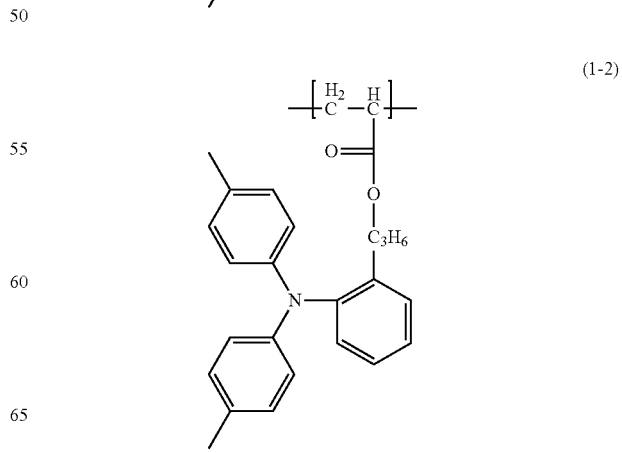

(1-2)

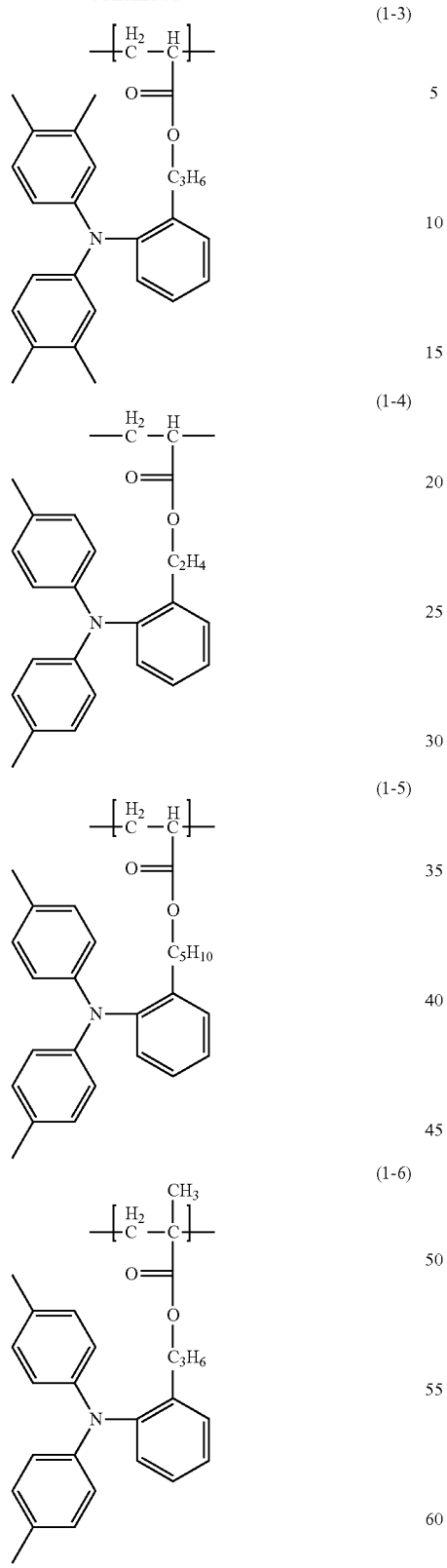
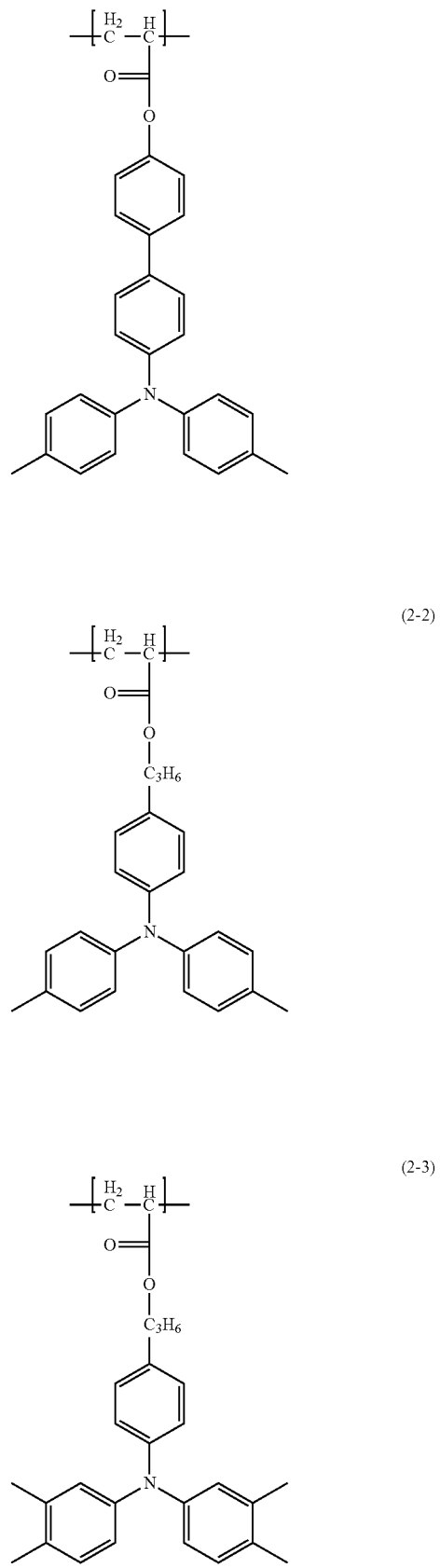
Preferred examples of the structure represented by the general formula (2) are represented by the formula (2-1) to the formula (2-6). Of those, structures represented by the formula (2-2) and the formula (2-3) are more preferred.

(2-4)
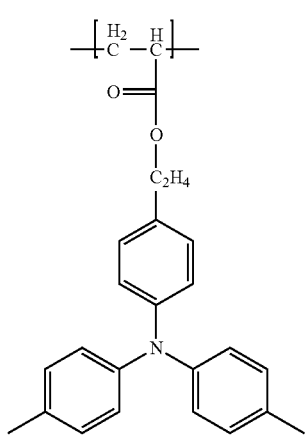

(2-5)
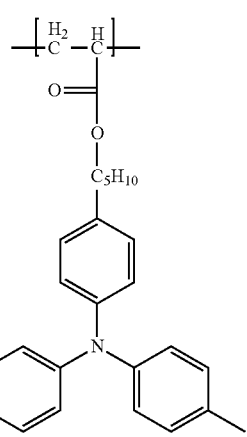

(2-6)
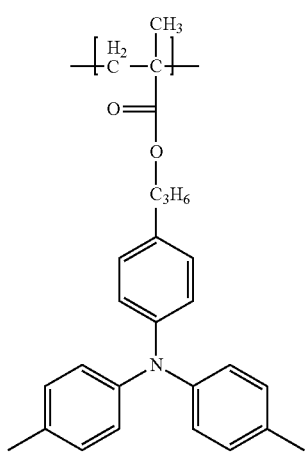

The molar ratio of the structure represented by the general formula (1) to the structure represented by the general formula (2) in the protective layer preferably falls within the range of 0.05 or more and 0.70 or less. When the molar ratio of the structure represented by the general formula (1) to the structure represented by the general formula (2) falls within the range, the aggregation of the triarylamine structures in the protective layer can be further suppressed, and hence the exposure memory can be further reduced.

In addition, the resin in the protective layer preferably further contains a resin having a structure represented by the general formula (3). When the resin has the structure represented by the general formula (3), the electrophotographic photosensitive member can obtain satisfactory durability.

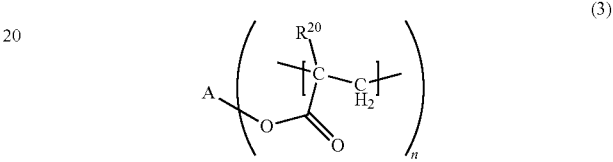

In the formula (3), A represents an organic group, $R^{20}$s each independently represent a hydrogen atom or a methyl group, and "n" represents an integer of 2 or more and 6 or less.

The structure represented by the general formula (3) is preferably a structure represented by the general formula (31).

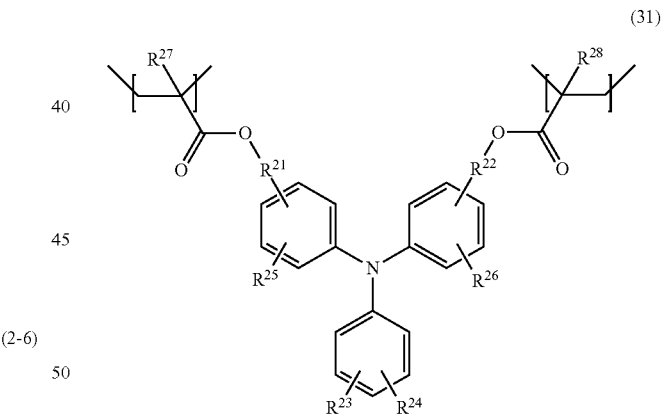

In the formula (31), $R^{21}$ and $R^{22}$ each independently represent an alkylene group that may have a substituent. The substituent of the alkylene group may be, for example, a methyl group. $R^{23}$ to $R^{28}$ each independently represent a hydrogen atom or a methyl group. In addition, $R^{21}$ and $R^{22}$ each preferably represent an alkylene group having 2 or more and 5 or less carbon atoms.

Preferred examples of the structure represented by the general formula (3) are represented by the formula (3-1) to the formula (3-4). Of those, structures represented by the formula (3-3) and the formula (3-4) each corresponding to the structure represented by the general formula (31) are more preferred.

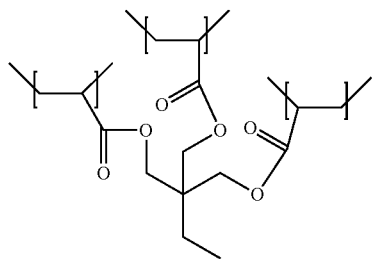
(3-1)

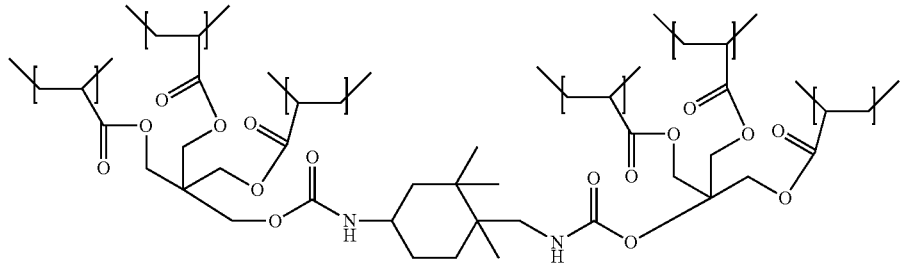
(3-2)

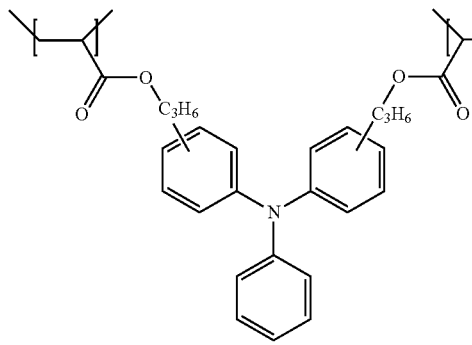
(3-3)

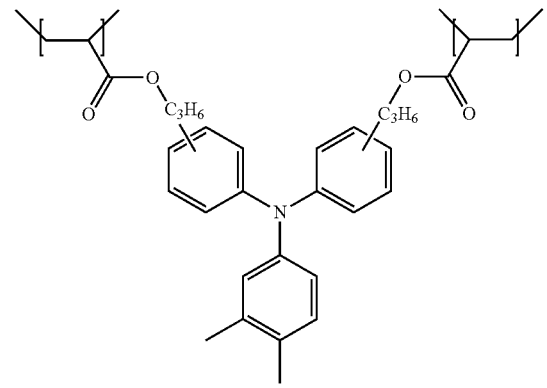
(3-4)

In addition, the content of the structure represented by the general formula (3) in the resin in the protective layer is 0.2 or more and 10 or less, preferably 0.5 or more and 2 or less with respect to the total of the masses of the structure represented by the general formula (1) and the structure represented by the general formula (2).

In addition, the protective layer may have a structural unit having a charge-transporting ability in addition to such structures each having a charge-transporting ability as represented by the general formulae (1), (2), and (31). Examples of the structural unit having a charge-transporting ability except those described above include a polycyclic aromatic structure, a heterocyclic structure, a hydrazone structure, a styryl structure, an enamine structure, a benzidine structure, and a triarylamine structure. In addition, the molecular weight Mw of the structural unit is preferably from 100 to 1,000. The ratio of the total mass of all the structural units including the structures each having a charge-transporting ability as represented by the general formulae (1), (2), and (31) each having a charge-transporting ability (the total mass of all the structural units) to the mass of the entirety of the protective layer is preferably 0.4 or more and 1.0 or less. In this case, the electrophotographic photosensitive member of the present disclosure can obtain satisfactory electrical characteristics. Further, the ratio of the total mass of the structures represented by the general formulae (1) and (2) to the total mass of the structural units each having a charge-transporting ability is preferably 0.1 or more and 1.0 or less. In this case, appropriate strain can be added to the molecular structure of the polymer chain forming the resin in the protective layer to suppress the excessive aggregation of the triarylamine structures, and hence the exposure memory of the electrophotographic photosensitive member of the present disclosure can be reduced.

When the respective constructions synergistically affect each other as described above, the effects of the present disclosure can be achieved.

[Electrophotographic Photosensitive Member]

The electrophotographic photosensitive member according to one aspect of the present disclosure includes the support, the photosensitive layer, and the protective layer.

A method of producing the electrophotographic photosensitive member according to one aspect of the present disclosure is, for example, a method involving: preparing coating liquids for the respective layers to be described later; applying the liquids in a desired layer order; and drying the liquids. At this time, a method of applying each of the coating liquids is, for example, dip coating, spray coating, inkjet coating, roll coating, die coating, blade coating, curtain coating, wire bar coating, or ring coating. Of those, dip coating is preferred from the viewpoints of efficiency and productivity.

The respective layers are described below.

<Support>

In the present disclosure, the electrophotographic photosensitive member includes the support. In the present disclosure, the support is preferably an electroconductive support having electroconductivity. In addition, examples of the shape of the support include a cylindrical shape, a belt shape, and a sheet shape. Of those, a cylindrical support is preferred. In addition, the surface of the support may be subjected to, for example, an electrochemical treatment, such as anodization, a blast treatment, or a cutting treatment.

A metal, a resin, a glass, or the like is preferred as a material for the support.

Examples of the metal include aluminum, iron, nickel, copper, gold, and stainless steel, and alloys thereof. Of those, an aluminum support using aluminum is preferred.

In addition, electroconductivity may be imparted to the resin or the glass through a treatment involving, for example, mixing or coating the resin or the glass with an electroconductive material.

<Electroconductive Layer>

In the present disclosure, an electroconductive layer may be arranged on the support. The arrangement of the electroconductive layer can conceal flaws and irregularities in the surface of the support, and control the reflection of light on the surface of the support.

The electroconductive layer preferably contains electroconductive particles and a resin.

A material for the electroconductive particles is, for example, a metal oxide, a metal, or carbon black. Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, a metal oxide is preferably used as the electroconductive particles, and in particular, titanium oxide, tin oxide, and zinc oxide are more preferably used.

When the metal oxide is used as the electroconductive particles, the surface of the metal oxide may be treated with a silane coupling agent or the like, or the metal oxide may be doped with an element, such as phosphorus or aluminum, or an oxide thereof.

In addition, each of the electroconductive particles may be of a laminated construction having a core particle and a coating layer coating the particle. Examples of the core particle include titanium oxide, barium sulfate, and zinc oxide. The coating layer is, for example, a metal oxide, such as tin oxide.

In addition, when the metal oxide is used as the electroconductive particles, their volume-average particle diameter is preferably 1 nm or more and 500 nm or less, more preferably 3 nm or more and 400 nm or less.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain a concealing agent, such as a silicone oil, resin particles, or titanium oxide.

The average thickness of the electroconductive layer is preferably 1 µm or more and 50 µm or less, particularly preferably 3 µm or more and 40 µm or less.

The electroconductive layer may be formed by: preparing a coating liquid for an electroconductive layer containing the above-mentioned respective materials and a solvent; forming a coat of the liquid; and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. As a dispersion method for dispersing the electroconductive particles in the coating liquid for an electroconductive layer, there are given methods using a paint shaker, a sand mill, a ball mill, and a liquid collision-type high-speed disperser.

<Undercoat Layer>

In the present disclosure, an undercoat layer may be arranged on the support or the electroconductive layer. The arrangement of the undercoat layer can improve an adhesive function between layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamide acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In addition, the undercoat layer may further contain an electron-transporting substance, a metal oxide, a metal, an electroconductive polymer, and the like for the purpose of improving electric characteristics. Of those, an electron-transporting substance and a metal oxide are preferably used.

Examples of the electron-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron-transporting substance having a polymerizable functional group may be used as the electron-transporting substance and copolymerized with the above-mentioned monomer having a polymerizable functional group to form an undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

In addition, the undercoat layer may further contain an additive.

The average thickness of the undercoat layer is preferably 0.1 µm or more and 50 µm or less, more preferably 0.2 µm or more and 40 µm or less, particularly preferably 0.3 µm or more and 30 µm or less.

The undercoat layer may be formed by: preparing a coating liquid for an undercoat layer containing the above-mentioned respective materials and a solvent; forming a coat of the liquid; and drying and/or curing the coat. Examples of the solvent to be used for the coating liquid include an alcohol-based solvent, a ketone-based solvent, an ether-based solvent, an ester-based solvent, and an aromatic hydrocarbon-based solvent.

<Photosensitive Layer>

The photosensitive layers of electrophotographic photosensitive members are mainly classified into (1) a laminated photosensitive layer and (2) a single-layer photosensitive layer. (1) The laminated photosensitive layer has a charge-generating layer containing a charge-generating substance and a charge-transporting layer containing a charge-transporting substance. (2) The single-layer photosensitive layer has a photosensitive layer containing both a charge-generating substance and a charge-transporting substance.

(1) Laminated Photosensitive Layer

The laminated photosensitive layer has the charge-generating layer and the charge-transporting layer.

(1-1) Charge-Generating Layer

The charge-generating layer preferably contains the charge-generating substance and a resin.

Examples of the charge-generating substance include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanine pigment, a chlorogallium phthalocyanine pigment, and a hydroxygallium phthalocyanine pigment are preferred.

The content of the charge-generating substance in the charge-generating layer is preferably 40 mass % or more and 85 mass % or less, more preferably 60 mass % or more and 80 mass % or less with respect to the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge-generating layer may further contain an additive, such as an antioxidant or a UV absorber. Specific examples thereof include a hindered phenol compound, a hindered amine compound, a sulfur compound, a phosphorus compound, and a benzophenone compound.

The average thickness of the charge-generating layer is preferably 0.1 μm or more and 1 μm or less, more preferably 0.15 μm or more and 0.4 μm or less.

The charge-generating layer may be formed by: preparing a coating liquid for a charge-generating layer containing the above-mentioned respective materials and a solvent; forming a coat of the liquid; and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

(1-2) Charge-Transporting Layer

The charge-transporting layer preferably contains the charge-transporting substance and a resin.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

The content of the charge-transporting substance in the charge-transporting layer is preferably 25 mass % or more and 70 mass % or less, more preferably 30 mass % or more and 55 mass % or less with respect to the total mass of the charge-transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge-transporting substance and the resin is preferably from 4:10 to 20:10, more preferably from 5:10 to 12:10.

In addition, the charge-transporting layer may contain an additive, such as an antioxidant, a UV absorber, a plasticizer, a leveling agent, a lubricity-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The average thickness of the charge-transporting layer is preferably 5 μm or more and 50 μm or less, more preferably 8 μm or more and 40 μm or less, particularly preferably 10 μm or more and 30 μm or less.

The charge-transporting layer may be formed by: preparing a coating liquid for a charge-transporting layer containing the above-mentioned respective materials and a solvent; forming a coat of the liquid; and drying the coat. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

Compounds represented by the formula (CTM-1) to the formula (CTM-10) are given below as examples of a compound that can be suitably used as the charge-transporting substance.

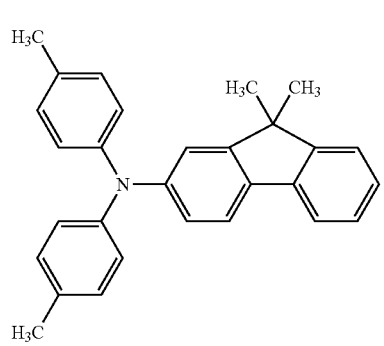

-continued
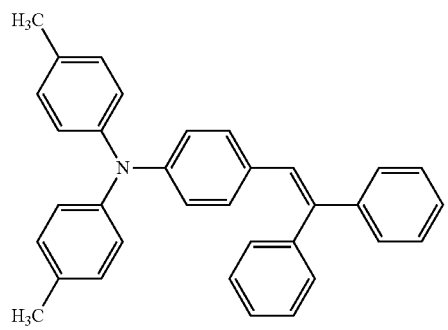
(CTM-3)
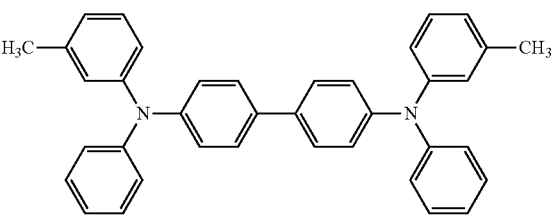
(CTM-4)
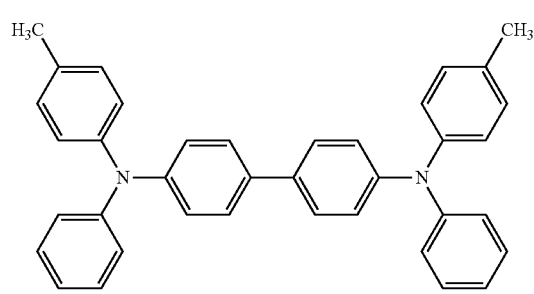
(CTM-5)
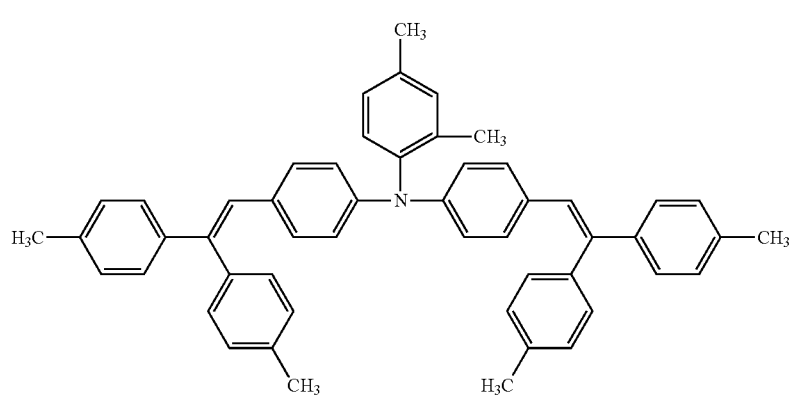
(CTM-6)
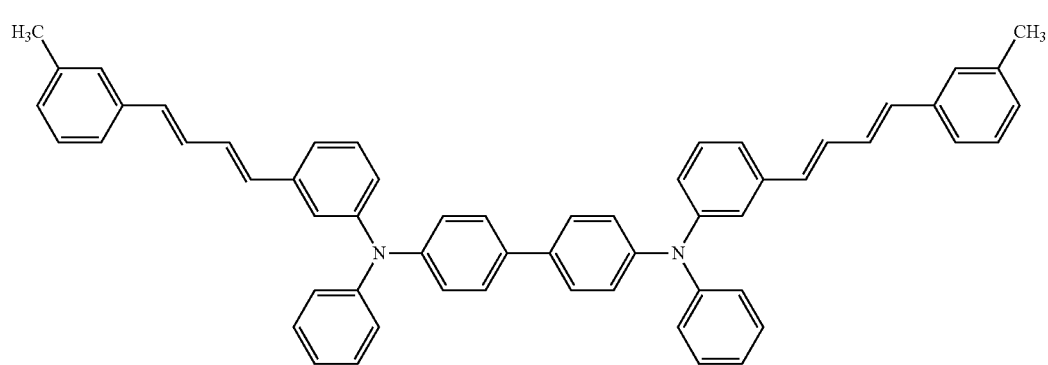
(CTM-7)

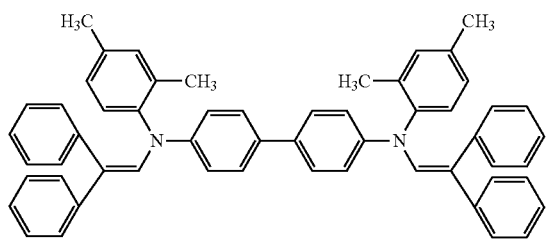
(CTM-8)

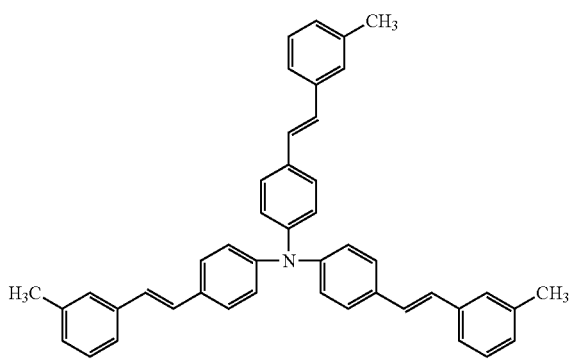
(CTM-9)

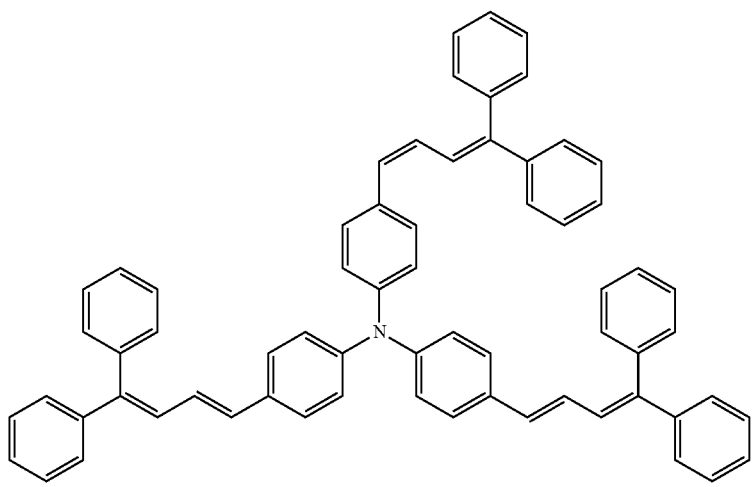
(CTM-10)

(2) Single-Layer Photosensitive Layer

The single-layer photosensitive layer may be formed by: preparing a coating liquid for a photosensitive layer containing the charge-generating substance, the charge-transporting substance, a resin, and a solvent; forming a coat of the liquid; and drying the coat. Examples of the charge-generating substance, the charge-transporting substance, and the resin are the same as those of the materials in the section "(1) Laminated Photosensitive Layer."

The average thickness of the single-layer photosensitive layer is preferably 5 μm or more and 50 μm or less, more preferably 8 μm or more and 40 μm or less, particularly preferably 10 μm or more and 30 μm or less.

<Protective Layer>

The electrophotographic photosensitive member according to one aspect of the present disclosure includes the protective layer on the photosensitive layer.

As described in the foregoing, the protective layer is the resin having the structure represented by the general formula (1) and the structure represented by the general formula (2). The protective layer may be formed as a cured film by polymerizing a composition containing polymerizable compounds corresponding to the structure represented by the general formula (1) and the structure represented by the general formula (2). A reaction at that time is, for example, a thermal polymerization reaction, a photopolymerization reaction, or a radiation polymerization reaction. Examples of the polymerizable functional groups of the polymerizable compounds include an acryloyl group and a methacryloyl group.

The polymerizable compounds corresponding to the structure represented by the general formula (1) and the structure represented by the general formula (2) are, for example, a polymerizable compound represented by the general formula (1A) and a polymerizable compound represented by the general formula (2A), respectively. That is, the protective layer of the electrophotographic photosensitive member according to one aspect of the present disclosure contains a polymer of a composition containing the polymerizable compound represented by the general formula (1A) and the polymerizable compound represented by the general formula (2A).

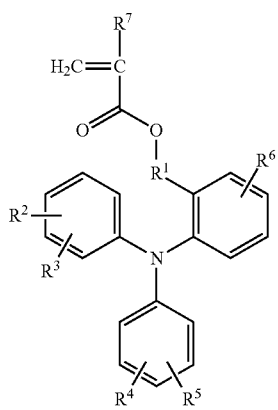

(1A)

In the formula (1A), $R^1$ represents an alkylene group or phenylene group that may have a substituent. $R^2$ to $R^7$ each represent a hydrogen atom, a methyl group, or an ethyl group. In addition, $R^1$ preferably represents an alkylene group having 2 or more and 5 or less carbon atoms, and $R^7$ preferably represents a hydrogen atom.

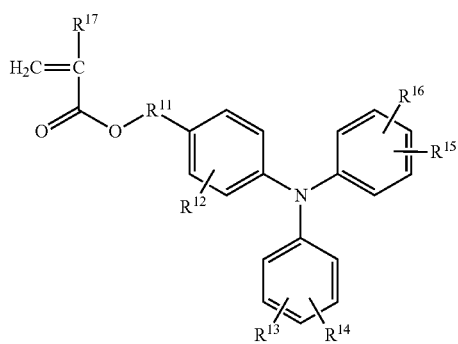

(2A)

In the formula (2A), $R^{11}$ represents an alkylene group or phenylene group that may have a substituent. $R^{12}$ to $R^{17}$ each independently represent a hydrogen atom, a methyl group, or an ethyl group. In addition, $R^{11}$ preferably represents an alkylene group having 2 or more and 5 or less carbon atoms, and $R^{17}$ preferably represents a hydrogen atom.

In addition, the composition containing the polymerizable compounds may further contain a polymerizable compound represented by the general formula (3A).

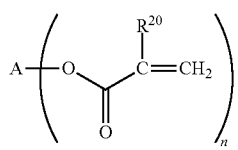

(3A)

In the formula (3A), A represents an organic group, $R^{20}$s each independently represent a hydrogen atom or a methyl group, and "n" represents an integer of 2 or more and 6 or less.

The structure represented by the general formula (3A) is preferably a structure represented by the general formula (31A).

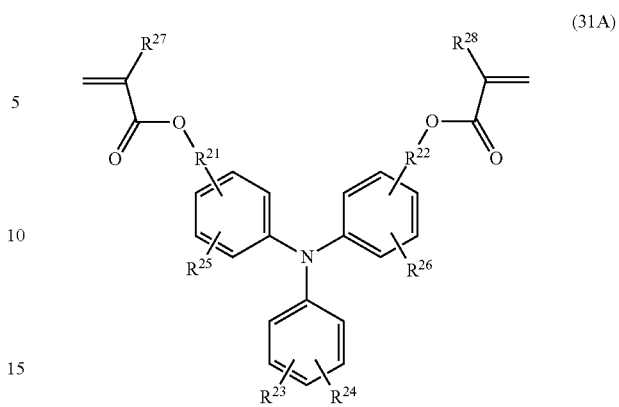

(31A)

In the formula (31A), $R^{21}$ and $R^{22}$ each independently represent an alkylene group that may have a substituent, and $R^{23}$ to $R^{28}$ each independently represent a hydrogen atom or a methyl group.

The protective layer may contain an additive, such as an antioxidant, a UV absorber, a plasticizer, a leveling agent, a lubricity-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The protective layer may contain electroconductive particles and/or a charge-transporting substance, and a resin.

Examples of the electroconductive particles include metal oxide particles, such as titanium oxide, zinc oxide, tin oxide, and indium oxide.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred.

The average thickness of the protective layer is preferably 0.5 μm or more and 10 μm or less, more preferably 1 μm or more and 7 μm or less.

The protective layer may be formed by: preparing a coating liquid for a protective layer containing the above-mentioned respective materials and a solvent; forming a coat of the liquid; and drying and/or curing the coat. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

[Process Cartridge and Electrophotographic Image-Forming Apparatus]

A process cartridge according to one aspect of the present disclosure integrally supports the electrophotographic photosensitive member that has been described above, and at least one unit selected from the group consisting of a charging unit, a developing unit, and a cleaning unit, and is removably mounted onto the main body of an electrophotographic apparatus.

In addition, an electrophotographic apparatus according to one aspect of the present disclosure includes the electrophotographic photosensitive member that has been described above, and at least one unit selected from the group consisting of a charging unit, an exposing unit, a developing unit, and a transferring unit.

An example of the schematic construction of an electrophotographic apparatus including a process cartridge including an electrophotographic photosensitive member is illustrated in FIGURE.

First, reference numerals in FIGURE are described.

An electrophotographic photosensitive member is represented by reference numeral 1, a shaft is represented by reference numeral 2, a charging unit is represented by reference numeral 3, exposure light is represented by reference numeral 4, a developing unit is represented by reference numeral 5, a transferring unit is represented by reference numeral 6, a transfer material is represented by reference numeral 7, a fixing unit is represented by reference numeral 8, a cleaning unit is represented by reference numeral 9, and pre-exposure light is represented by reference numeral 10.

A process cartridge is represented by reference numeral 11 and a guiding unit is represented by reference numeral 12.

An electrophotographic photosensitive member 1 having a cylindrical shape is rotationally driven at a predetermined peripheral speed in a direction indicated by the arrow about a shaft 2 as a center. The surface of the electrophotographic photosensitive member 1 is charged to a predetermined positive or negative potential by a charging unit 3. In FIGURE, a roller charging system based on a roller-type charging member is illustrated, but a charging system such as a corona charging system, a proximity charging system, or an injection charging system may be adopted. The charged surface of the electrophotographic photosensitive member 1 is irradiated with exposure light 4 from an exposing unit (not shown), and hence an electrostatic latent image corresponding to target image information is formed thereon. The electrostatic latent image formed on the surface of the electrophotographic photosensitive member 1 is developed with toner stored in a developing unit 5, and hence a toner image is formed on the surface of the electrophotographic photosensitive member 1. The toner image formed on the surface of the electrophotographic photosensitive member 1 is transferred onto a transfer material 7 by a transferring unit 6. The transfer material 7 onto which the toner image has been transferred is conveyed to a fixing unit 8, is subjected to a treatment for fixing the toner image, and is printed out to the outside of the electrophotographic apparatus. The electrophotographic apparatus may include a cleaning unit 9 for removing a deposit, such as the toner remaining on the surface of the electrophotographic photosensitive member 1 after the transfer. The cleaning unit 9 is preferably a cleaning blade having a urethane resin. In addition, a so-called cleaner-less system configured to remove the deposit with the developing unit or the like without separate arrangement of the cleaning unit 9 may be used. The electrophotographic apparatus may include an electricity-removing mechanism configured to subject the surface of the electrophotographic photosensitive member 1 to an electricity-removing treatment with pre-exposure light 10 from a pre-exposing unit (not shown). In addition, a guiding unit 12, such as a rail, may be arranged for removably mounting a process cartridge 11 according to one aspect of the present disclosure onto the main body of an electrophotographic image-forming apparatus.

The electrophotographic photosensitive member according to one aspect of the present disclosure can be used in an electrophotographic image-forming apparatus, such as a laser beam printer, an LED printer, a copying machine, a facsimile, or a multifunctional peripheral thereof.

EXAMPLES

The present disclosure is described in more detail below by way of Examples and Comparative Examples. The present disclosure is by no means limited to the following Examples, and various modifications may be made without departing from the gist of the present disclosure. In the description of the following Examples, "part(s)" is by mass unless otherwise specified.

Production of Electrophotographic Photosensitive Member

Example 1

An aluminum cylinder having a diameter of 24 mm and a length of 257.5 mm (JIS-A3003, aluminum alloy) was used as a support (electroconductive support).

Next, the following materials were prepared.

Titanium oxide ($TiO_2$) particles coated with oxygen-deficient tin oxide ($SnO_2$) (average primary particle diameter: 230 nm) serving as metal oxide particles: 214 parts Phenol resin (monomer/oligomer of phenol resin) (product name: PLYOPHEN J-325, manufactured by DIC Corporation, resin solid content: 60 mass %) serving as a binding material: 132 parts 1-Methoxy-2-propanol serving as a solvent: 98 parts Those materials were loaded into a sand mill using 450 parts of glass beads each having a diameter of 0.8 mm, and were subjected to a dispersion treatment under the conditions of a number of revolutions of 2,000 rpm, a dispersion treatment time of 4.5 hours, and a preset temperature of cooling water of 18° C. to provide a dispersion liquid. The glass beads were removed from the dispersion liquid with a mesh (aperture: 150 μm). Silicone resin particles (product name: TOSPEARL 120, manufactured by Momentive Performance Materials Inc., average particle diameter: 2 μm) serving as a surface roughness-imparting material were added to the resultant dispersion liquid. The addition amount of the silicone resin particles was set to 10 mass % with respect to the total mass of the metal oxide particles and the binding material in the dispersion liquid after the removal of the glass beads. In addition, a silicone oil (product name: SH28PA, manufactured by Dow Corning Toray Co., Ltd.) serving as a leveling agent was added to the dispersion liquid so that its addition amount became 0.01 mass % with respect to the total mass of the metal oxide particles and the binding material in the dispersion liquid. Next, a mixed solvent of methanol and 1-methoxy-2-propanol (mass ratio: 1:1) was added to the dispersion liquid so that the total mass of the metal oxide particles, the binding material, and the surface roughness-imparting material (i.e., the mass of a solid content) in the dispersion liquid became 67 mass % with respect to the mass of the dispersion liquid. After that, the mixture was stirred to prepare a coating liquid for an electroconductive layer. The coating liquid for an electroconductive layer was applied onto the support by dip coating, and was heated for 1 hour at 140° C. Thus, an electroconductive layer having a thickness of 30 μm was formed.

Next, the following materials were prepared.
Electron-transporting substance represented by the following formula (E-1): 4 parts
Blocked isocyanate (product name: Duranate SBN-70D, manufactured by Asahi Kasei Chemicals Corporation): 5.5 parts
Polyvinyl butyral resin (product name: S-LEC KS-5Z, manufactured by Sekisui Chemical Co., Ltd.): 0.3 part
Zinc(II) hexanoate (manufactured by Mitsuwa Chemicals Co., Ltd.) serving as a catalyst: 0.05 part Those materials were dissolved in a mixed solvent of 50 parts of tetrahydrofuran and 50 parts of 1-methoxy-2-propanol. Thus, a coating liquid for an undercoat layer was prepared. The coating liquid for an undercoat layer was applied onto the electroconductive layer by dip coating, and was heated for 30 minutes at 170° C. Thus, an undercoat layer having a thickness of 0.7 μm was formed.

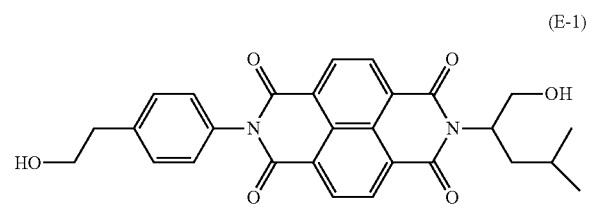

(E-1)

Next, 10 parts of hydroxygallium phthalocyanine of a crystal form having peaks at positions of 7.5° and 28.4° in a chart obtained by CuKα characteristic X-ray diffraction, and 5 parts of a polyvinyl butyral resin (product name: S-LEC BX-1, manufactured by Sekisui Chemical Co., Ltd.) were prepared. Those materials were added to 200 parts of cyclohexanone, and were dispersed therein with a sand mill apparatus using glass beads each having a diameter of 0.9 mm for 6 hours. 150 Parts of cyclohexanone and 350 parts of ethyl acetate were further added to the resultant to dilute the resultant. Thus, a coating liquid for a charge-generating layer was obtained. The resultant coating liquid was applied onto the undercoat layer by dip coating, and was dried at 95° C. for 10 minutes. Thus, a charge-generating layer having a thickness of 0.20 μm was formed.

The X-ray diffraction measurement was performed under the following conditions.

[Powder X-ray Diffraction Measurement]
Measurement apparatus used: X-ray diffraction apparatus RINT-TTRII, manufactured by Rigaku Corporation
X-ray tube: Cu
Tube voltage: 50 KV
Tube current: 300 mA
Scan method: 2θ/θ scan
Scan rate: 4.0°/min
Sampling interval: 0.02°
Start angle (2θ): 5.0°
Stop angle (2θ): 40.0°
Attachment: standard sample holder
Filter: not used
Incident monochromator: used
Counter monochromator: not used
Divergence slit: open
Divergence longitudinal restriction slit: 10.00 mm
Scattering slit: open
Light receiving slit: open
Flat plate monochromator: used
Counter: scintillation counter Next, the following materials were prepared.
Charge-transporting substance represented by the formula (CTM-1): 6 parts
Charge-transporting substance represented by the formula (CTM-4): 3 parts
Charge-transporting substance represented by the formula (CTM-2): 1 part
Polycarbonate (product name: Iupilon Z400, manufactured by Mitsubishi Engineering-Plastics Corporation): 10 parts
0.02 Part of a polycarbonate resin having copolymerization units represented by the following structural formula (C-4) and the following structural formula (C-5) (x:y=0.95:0.05, viscosity-average molecular weight= 20,000)

Those materials were dissolved in a mixed solvent of 25 parts of orthoxylene, 25 parts of methyl benzoate, and 25 parts of dimethoxymethane. Thus, a coating liquid for a charge-transporting layer was prepared. The coating liquid for a charge-transporting layer was applied onto the charge-generating layer by dip coating to form a coat, and the coat was dried for 30 minutes at 120° C. Thus, a charge-transporting layer having a thickness of 16 μm was formed.

(C-4)

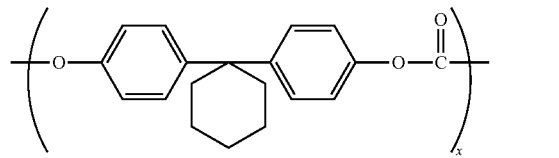

(C-5)

Next, the following materials were prepared.
Compound represented by the following formula (1-1A): 3.6 parts
Compound represented by the following formula (2-1A): 8.4 parts
Compound represented by the following formula (3-1A): 12 parts Siloxane-modified acrylic compound: 0.1 part (SYMAC US-270, manufactured by Toagosei Co., Ltd.)

(1-1A)
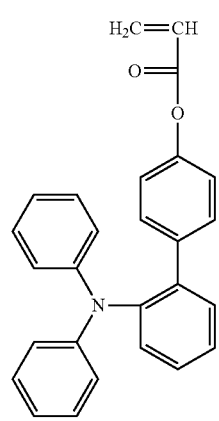

(2-1A)
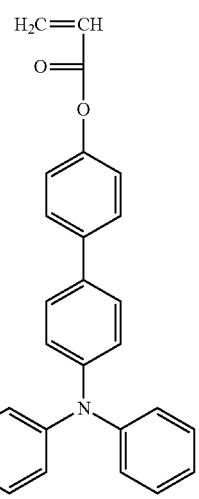

(3-1A)
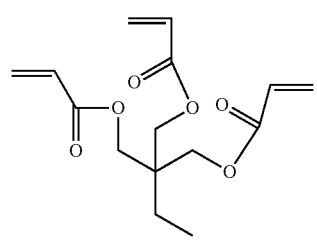

Those materials were mixed with 60 parts of tetrahydrofuran, and the mixture was stirred. Thus, a coating liquid for a protective layer was prepared.

The coating liquid for a protective layer was applied onto the charge-transporting layer by dip coating to form a coat, and the resultant coat was dried for 6 minutes at 50° C. After that, under a nitrogen atmosphere, the coat was irradiated with electron beams for 2.8 seconds under the conditions of an acceleration voltage of 50 kV and a beam current of 5.0 mA while a distance between the support (irradiated body) and an electron beam irradiation window was kept at 20 mm, and the support (irradiated body) was rotated at a speed of 200 rpm. The absorbed dose of the electron beams at this time was measured to be 15 kGy. After that, under a nitrogen atmosphere, the temperature of the coat was increased from 25° C. to 117° C. over 20 seconds, followed by the heating of the coat. An oxygen concentration during a time period from the electron beam irradiation to the subsequent heating treatment was 10 ppm or less. Next, in the atmosphere, the coat was naturally cooled until its temperature became 25° C., and a heating treatment was performed for 30 minutes under such a condition that the temperature of the coat became 105° C. Thus, a protective layer having a thickness of 3 μm was formed. Thus, a cylindrical (drum-shaped) electrophotographic photosensitive member including the protective layer of Example 1 was produced.

Example 2

In Example 1, 3.6 parts of the compound represented by the formula (1-1A) was changed to 3.6 parts of a compound represented by the following formula (1-2A), 8.4 parts of the compound represented by the formula (2-1A) was changed to 8.4 parts of a compound represented by the following formula (2-2A), 12 parts of the compound represented by the formula (3-1A) was changed to 12 parts of a compound represented by the following formula (3-2A), and 60 parts of tetrahydrofuran was changed to a mixed solvent of 42 parts of cyclohexane and 18 parts of 1-propanol. An electrophotographic photosensitive member was produced in the same manner as in Example 1 except the foregoing.

(1-2A)
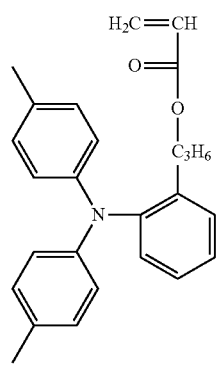

(2-2A)
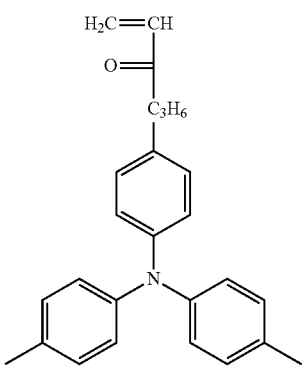

-continued (3-2A)

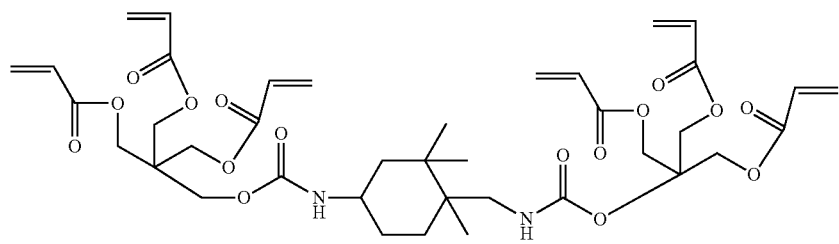

Example 3

In Example 2, 12 parts of the compound represented by the formula (3-2A) was changed to 6 parts of the compound represented by the formula (3-2A) and 6 parts of a compound represented by the following formula (3-3A). An electrophotographic photosensitive member was produced in the same manner as in Example 2 except the foregoing.

(3-3A)

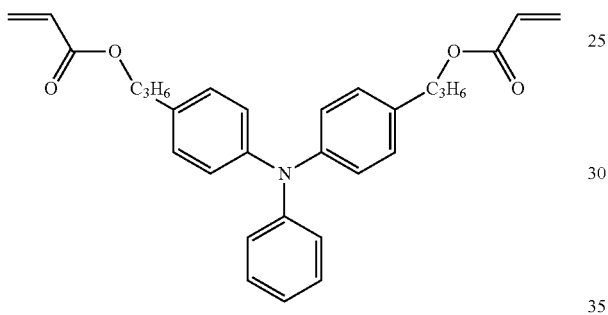

Example 4

In Example 2, 12 parts of the compound represented by the formula (3-2A) was changed to 12 parts of the compound represented by the formula (3-3A). An electrophotographic photosensitive member was produced in the same manner as in Example 2 except the foregoing.

Example 5

In Example 4, 12 parts of the compound represented by the formula (3-3A) was changed to 8 parts of a compound represented by the following formula (3-4A). An electrophotographic photosensitive member was produced in the same manner as in Example 4 except the foregoing.

(3-4A)

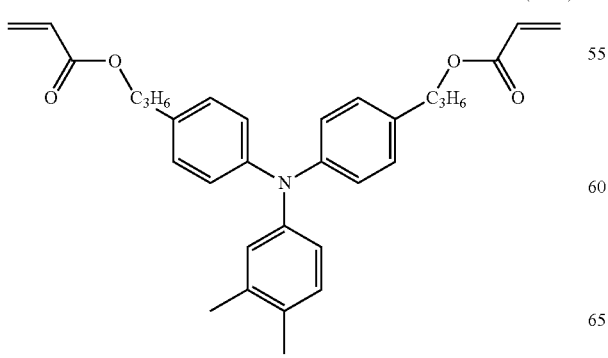

Example 6

In Example 5, 3.6 parts of the compound represented by the formula (1-2A) was changed to 3.6 parts of a compound represented by the following formula (1-3A), and 8.4 parts of the compound represented by the formula (2-2A) was changed to 8.4 parts of a compound represented by the following formula (2-3A). An electrophotographic photosensitive member was produced in the same manner as in Example 5 except the foregoing.

(1-3A)

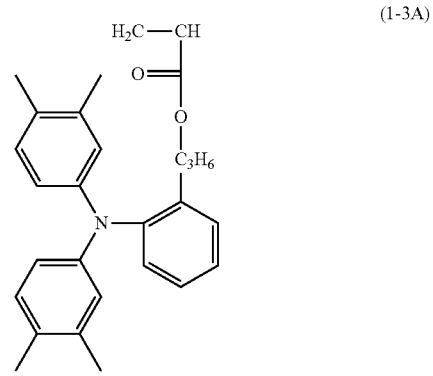

(2-3A)

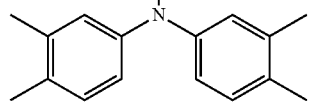

Example 7

In Example 5, 3.6 parts of the compound represented by the formula (1-2A) was changed to 3.6 parts of a compound represented by the following formula (1-4A), and 8.4 parts of the compound represented by the formula (2-2A) was changed to 8.4 parts of a compound represented by the following formula (2-4A). An electrophotographic photosensitive member was produced in the same manner as in Example 5 except the foregoing.

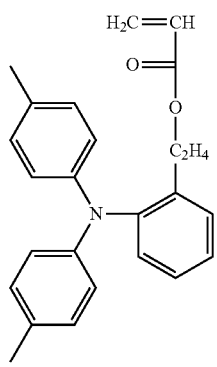

(1-4A)

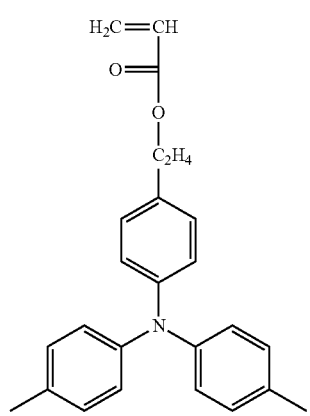

(2-4A)

Example 8

In Example 5, 3.6 parts of the compound represented by the formula (1-2A) was changed to 3.6 parts of a compound represented by the following formula (1-5A), and 8.4 parts of the compound represented by the formula (2-2A) was changed to 8.4 parts of the compound represented by the formula (2-1A). An electrophotographic photosensitive member was produced in the same manner as in Example 5 except the foregoing.

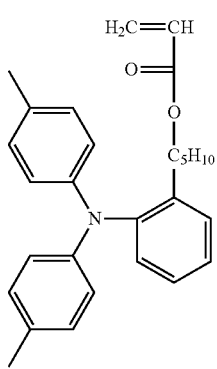

(1-5A)

Example 9

In Example 5, 3.6 parts of the compound represented by the formula (1-2A) was changed to 3.6 parts of the compound represented by the formula (1-3A), and 8.4 parts of the compound represented by the formula (2-2A) was changed to 8.4 parts of a compound represented by the following formula (2-5A). An electrophotographic photosensitive member was produced in the same manner as in Example 5 except the foregoing.

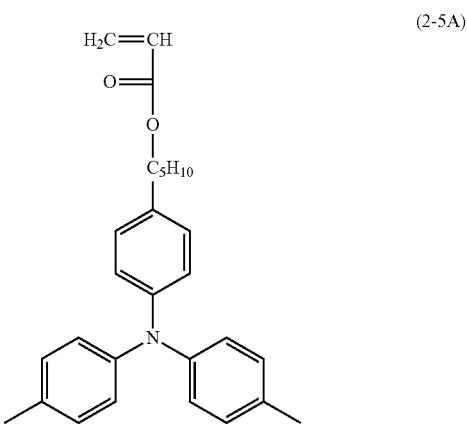

(2-5A)

Example 10

In Example 5, 3.6 parts of the compound represented by the formula (1-2A) was changed to 3.6 parts of a compound represented by the following formula (1-6A), and 8.4 parts of the compound represented by the formula (2-2A) was changed to 8.4 parts of a compound represented by the following formula (2-6A). An electrophotographic photosensitive member was produced in the same manner as in Example 5 except the foregoing.

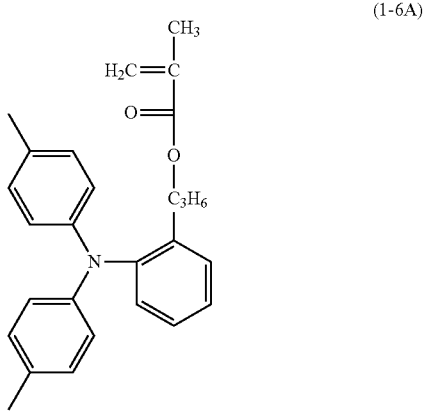

(1-6A)

(2-6A)

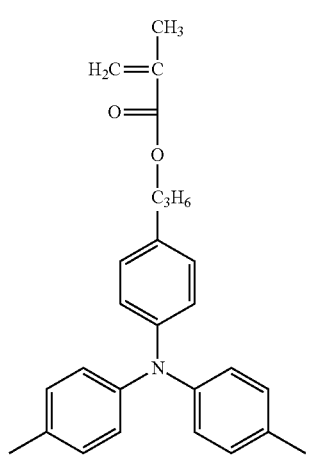

Example 11

In Example 5, the amount of the compound represented by the formula (1-2A) was changed from 3.6 parts to 0.6 part, the amount of the compound represented by the formula (2-2A) was changed from 8.4 parts to 1.4 parts, and the amount of the compound represented by the formula (3-4A) was changed from 8 parts to 18 parts. An electrophotographic photosensitive member was produced in the same manner as in Example 5 except the foregoing.

Example 12

In Example 5, the amount of the compound represented by the formula (1-2A) was changed from 3.6 parts to 1.0 part and the amount of the compound represented by the formula (2-2A) was changed from 8.4 parts to 11 parts. An electrophotographic photosensitive member was produced in the same manner as in Example 5 except the foregoing.

Example 13

In Example 5, the amount of the compound represented by the formula (1-2A) was changed from 3.6 parts to 5 parts and the amount of the compound represented by the formula (2-2A) was changed from 8.4 parts to 7 parts. An electrophotographic photosensitive member was produced in the same manner as in Example 5 except the foregoing.

Example 14

In Example 5, the amount of the compound represented by the formula (1-2A) was changed from 3.6 parts to 0.4 part and the amount of the compound represented by the formula (2-2A) was changed from 8.4 parts to 11.6 parts. An electrophotographic photosensitive member was produced in the same manner as in Example 5 except the foregoing.

Example 15

In Example 5, the amount of the compound represented by the formula (1-2A) was changed from 3.6 parts to 8 parts and the amount of the compound represented by the formula (2-2A) was changed from 8.4 parts to 4 parts. An electrophotographic photosensitive member was produced in the same manner as in Example 5 except the foregoing.

Comparative Example 1

In Example 1, the amount of the compound represented by the formula (1-1A) was changed from 3.6 parts to 12 parts, and 8.4 parts of the compound represented by the formula (2-1A) was not used. An electrophotographic photosensitive member was produced in the same manner as in Example 1 except the foregoing.

Comparative Example 2

In Comparative Example 1, 12 parts of the compound represented by the formula (1-1A) was changed to 12 parts of the compound represented by the formula (2-1A). An electrophotographic photosensitive member was produced in the same manner as in Comparative Example 1 except the foregoing.

<Analysis>

Analysis was performed by using each of the electrophotographic photosensitive members of Examples 1 to 15, and the electrophotographic photosensitive members of Comparative Examples 1 and 2 thus produced under the following conditions.

The surface of each of the resultant electrophotographic photosensitive members was shaved off with a razor. Thus, the protective layer was obtained. The molar ratio of a structure represented by the general formula (1) to a structure represented by the general formula (2) in the protective layer, the ratio of the total mass of structural units each having a charge-transporting ability to the entire mass of the protective layer, and the ratio of the total mass of the structures represented by the general formulae (1) and (2) to the total mass of the structural units each having a charge-transporting ability in the protective layer were determined by performing $^1$H-NMR measurement (apparatus name: AVANCE III 500, manufactured by Bruker) and pyrolysis gas chromatography measurement. The results are shown in Table 1.

<Evaluation>

An exposure memory was evaluated by using each of the electrophotographic photosensitive members of Examples 1 to 15, and the electrophotographic photosensitive members of Comparative Examples 1 and 2 thus produced under the following conditions.

A reconstructed machine of a laser beam printer (product name: HP LaserJet Enterprise Color M553dn, manufactured by Hewlett-Packard Company) was used as an electrophotographic apparatus. The electrophotographic apparatus used in the evaluation was reconstructed so that an image exposure light quantity and a voltage to be applied to a charging roller could be regulated and measured.

First, each of the electrophotographic photosensitive members of Examples and Comparative Examples was mounted on the cyan color cartridge of the electrophotographic apparatus.

Next, the voltage to be applied to the charging roller and the image exposure light quantity were adjusted so that, in an average potential in the circumferential direction of the electrophotographic photosensitive member at a position distant from the upper end of the support of the electrophotographic photosensitive member by 120 mm, a dark potential and a light potential became −500 V and −100 V, respectively. The measurement of the surface potential of the cylindrical electrophotographic photosensitive member at the time of the potential setting was performed by reconstructing the cartridge and mounting a potential probe (product name: model 6000B-8, manufactured by Trek Japan) at a development position. The potential was measured with a surface potentiometer (product name: model 344, manufactured by Trek Japan). The measurement was performed under a normal-temperature and normal-humidity environment at a temperature of 23° C. and a humidity of 50%.

The evaluation of the exposure memory was performed as described below. First, part of the surface (circumferential surface) of the electrophotographic photosensitive member was shielded from light (light-shielded portion), and a portion that was not shielded from light (irradiation portion) was irradiated with light from a fluorescent lamp having an illuminance of 1,500 lux for 5 minutes. Next, the photosensitive member was mounted on the reconstructed machine of the laser beam printer, and each of the light-shielded portion and the irradiation portion was subjected to charging and light exposure, followed by the measurement of the light potential of its surface. A difference (potential difference) $\Delta Vl$ [V] between the light potential of the irradiation portion and the light potential of the light-shielded portion was evaluated as the exposure memory.

$\Delta Vl$=light potential of irradiation portion–light potential of light-shielded portion The results of the evaluation are shown in Table 1. A smaller value for the $\Delta Vl$ means that the exposure memory is suppressed to a larger extent.

TABLE 1

|  | Molar ratio of structure represented by general formula (1) to structure represented by general formula (2) | Ratio of total mass of structural units each having charge-transporting ability to entire mass of protective layer | Ratio of total mass of structure represented by general formulae (1) and (2) to total mass of structural units each having charge-transporting ability | $\Delta Vl$ |
|---|---|---|---|---|
| Example 1 | 0.43 | 0.5 | 1.0 | 15 |
| Example 2 | 0.43 | 0.5 | 1.0 | 15 |
| Example 3 | 0.43 | 0.5 | 0.5 | 12 |
| Example 4 | 0.43 | 1.0 | 0.5 | 7 |
| Example 5 | 0.43 | 1.0 | 0.6 | 3 |
| Example 6 | 0.43 | 1.0 | 0.6 | 4 |
| Example 7 | 0.43 | 1.0 | 0.6 | 5 |
| Example 8 | 0.41 | 1.0 | 0.6 | 8 |
| Example 9 | 0.43 | 1.0 | 0.6 | 5 |
| Example 10 | 0.43 | 1.0 | 0.6 | 12 |
| Example 11 | 0.43 | 1.0 | 0.1 | 9 |
| Example 12 | 0.09 | 1.0 | 0.6 | 11 |
| Example 13 | 0.70 | 1.0 | 0.6 | 10 |
| Example 14 | 0.02 | 1.0 | 0.6 | 17 |
| Example 15 | 2.00 | 1.0 | 0.6 | 16 |
| Comparative Example 1 | — | 0.5 | 1.0 | 26 |
| Comparative Example 2 | — | 0.5 | 1.0 | 25 |

As described above by way of the embodiment and Examples, according to the present disclosure, the electrophotographic photosensitive member that is reduced in exposure memory, and is excellent in electrical characteristics and durability can be provided. In addition, according to other aspects of the present disclosure, the process cartridge and the electrophotographic image-forming apparatus each of which is reduced in exposure memory, and is excellent in electrical characteristics and durability can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-105590, filed May 31, 2018, which is hereby incorporated by reference herein in its entirety.

What is claimed is:

1. An electrophotographic photosensitive member comprising in this order:
a support;
a photosensitive layer; and
a protective layer,
wherein the protective layer contains a resin having a structure represented by the following general formula (1) and a structure represented by the following general formula (2):

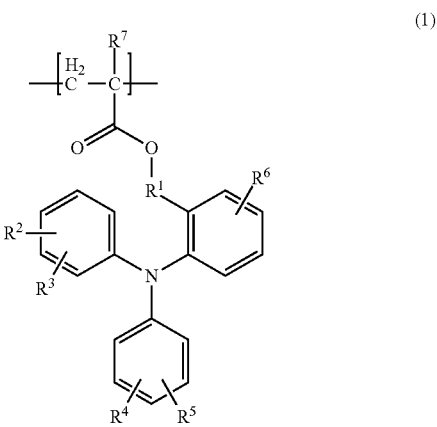

in the formula (1), $R^1$ represents an alkylene group or phenylene group that may have a substituent, and $R^2$ to $R^7$ each independently represent a hydrogen atom, a methyl group, or an ethyl group;

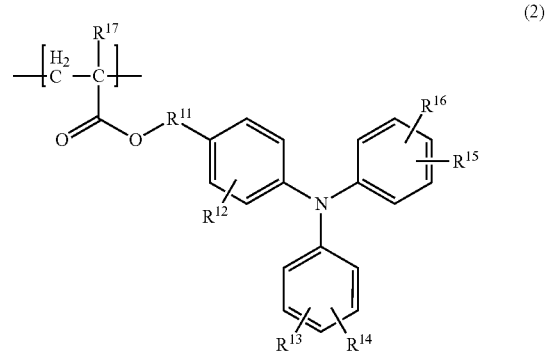

in the formula (2), $R^{11}$ represents an alkylene group or phenylene group that may have a substituent, and $R^{12}$ to $R^{17}$ each independently represent a hydrogen atom, a methyl group, or an ethyl group.

2. The electrophotographic photosensitive member according to claim 1, wherein a molar ratio of the structure represented by the general formula (1) to the structure represented by the general formula (2) is 0.05 or more and 0.70 or less.

3. The electrophotographic photosensitive member according to claim 1, wherein the protective layer contains the resin further having a structure represented by the following general formula (3):

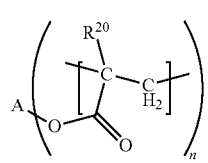
(3)

in the formula (3), A represents an organic group, $R^{20}$s each independently represent a hydrogen atom or a methyl group, and "n" represents an integer of 2 or more and 6 or less.

4. The electrophotographic photosensitive member according to claim 1, wherein a ratio of a total mass of structural units each having a charge-transporting ability to a mass of an entirety of the protective layer is 0.4 or more and 1.0 or less, and a ratio of a total mass of the structural units represented by the general formulae (1) and (2) to the total mass of the structural units each having a charge-transporting ability is 0.1 or more and 1.0 or less.

5. The electrophotographic photosensitive member according to claim 1, wherein $R^7$ in the general formula (1) represents a hydrogen atom, and $R^{17}$ in the general formula (2) represents a hydrogen atom.

6. The electrophotographic photosensitive member according to claim 3, wherein the structure represented by the general formula (3) comprises a structure represented by the following general formula (31):

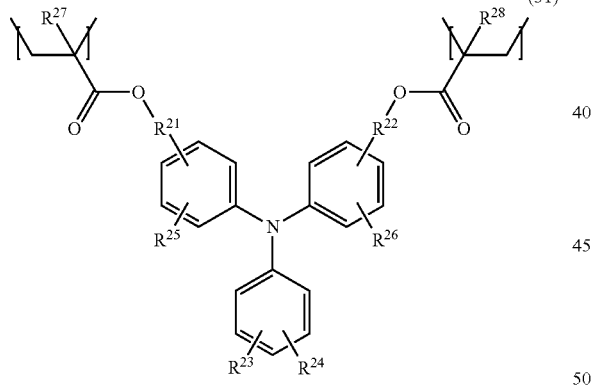
(31)

in the formula (31), $R^{21}$ and $R^{22}$ each independently represent an alkylene group that may have a substituent, and $R^{23}$ to $R^{28}$ each independently represent a hydrogen atom or a methyl group.

7. The electrophotographic photosensitive member according to claim 1, wherein $R^1$ in the general formula (1) and $R^{11}$ in the general formula (2) each independently represent an alkylene group having 2 or more and 5 or less carbon atoms.

8. An electrophotographic photosensitive member comprising in this order:
a support;
a photosensitive layer; and
a protective layer,
wherein the protective layer contains a polymer of a composition containing a polymerizable compound represented by the following general formula (1A) and a polymerizable compound represented by the following general formula (2A):

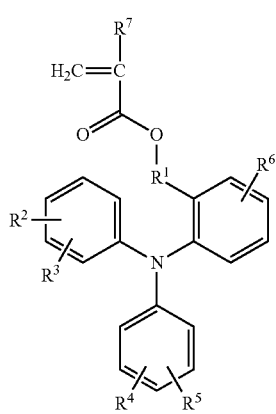
(1A)

in the formula (1A), $R^1$ represents an alkylene group or phenylene group that may have a substituent, and $R^2$ to $R^7$ each independently represent a hydrogen atom, a methyl group, or an ethyl group;

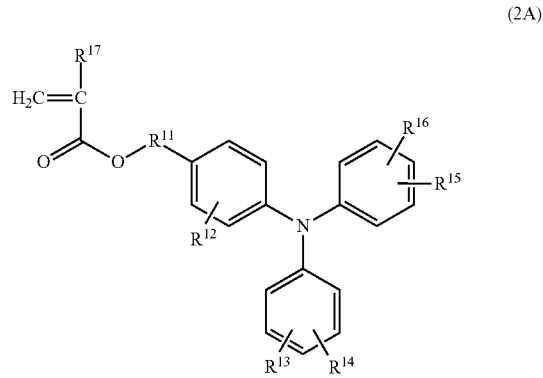
(2A)

in the formula (2A), $R^{11}$ represents an alkylene group or phenylene group that may have a substituent, and $R^{12}$ to $R^{17}$ each independently represent a hydrogen atom, a methyl group, or an ethyl group.

9. A process cartridge comprising:
the electrophotographic photosensitive member; and
at least one unit selected from the group consisting of a charging unit, a developing unit, and a cleaning unit,
the process cartridge integrally supporting the electrophotographic photosensitive member and the at least one unit, and being removably mounted onto a main body of an electrophotographic image-forming apparatus
wherein the electrophotographic photosensitive member comprises in this order:
a support;
a photosensitive layer; and
a protective layer,
wherein the protective layer contains a resin having a structure represented by the following general formula (1) and a structure represented by the following general formula (2):

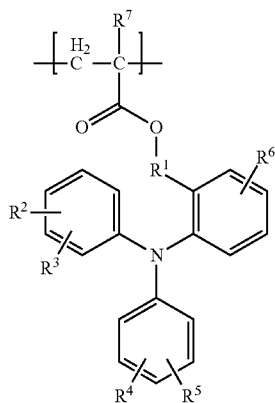

(1)

in the formula (1), $R^1$ represents an alkylene group or phenylene group that may have a substituent, and $R^2$ to $R^7$ each independently represent a hydrogen atom, a methyl group, or an ethyl group;

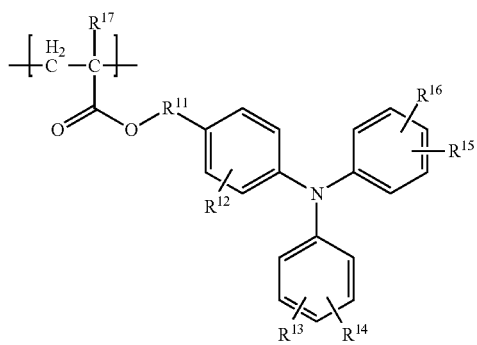

(2)

in the formula (2), $R^{11}$ represents an alkylene group or phenylene group that may have a substituent, and $R^{12}$ to $R^{17}$ each independently represent a hydrogen atom, a methyl group, or an ethyl group.

10. An electrophotographic image-forming apparatus comprising:
the electrophotographic photosensitive member; and
at least one unit selected from the group consisting of a charging unit, an exposing unit, a developing unit, and a transferring unit
wherein the electrophotographic photosensitive member comprises in this order:
a support;
a photosensitive layer; and
a protective layer,
wherein the protective layer contains a resin having a structure represented by the following general formula (1) and a structure represented by the following general formula (2):

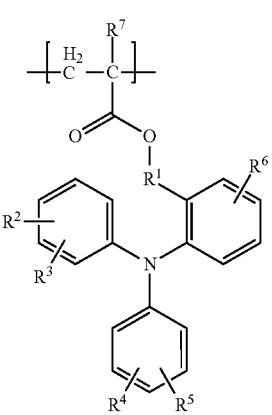

(1)

in the formula (1), $R^1$ represents an alkylene group or phenylene group that may have a substituent, and $R^2$ to $R^7$ each independently represent a hydrogen atom, a methyl group, or an ethyl group;

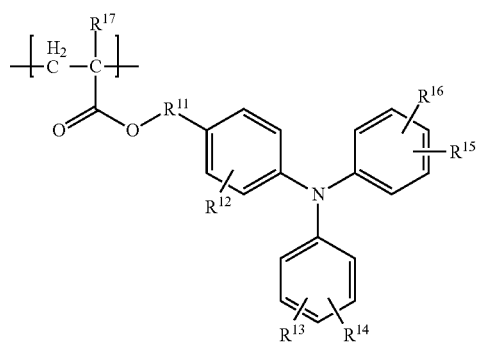

(2)

in the formula (2), $R^{11}$ represents an alkylene group or phenylene group that may have a substituent, and $R^{12}$ to $R^{17}$ each independently represent a hydrogen atom, a methyl group, or an ethyl group.

\* \* \* \* \*